(12) United States Patent
Lee et al.

(10) Patent No.: US 7,636,740 B2
(45) Date of Patent: Dec. 22, 2009

(54) DATABASE CACHE SYSTEM

(75) Inventors: Hun Joo Lee, Daejeon (KR); Jung Youl Lim, Seoul (KR); Yong Woo Jung, Daejeon (KR); Bum Hyun Lim, Daejeon (KR); Kwang Hyun Shim, Daejeon (KR); Jin Sung Choi, Daejeon (KR); Kwang Ho Yang, Daejeon (KR); Hyun Bin Kim, Daejeon (KR)

(73) Assignee: Electronic and Telecommunications Research Institute, Daejeon (KR)

( * ) Notice: Subject to any disclaimer, the term of this patent is extended or adjusted under 35 U.S.C. 154(b) by 235 days.

(21) Appl. No.: 11/265,851

(22) Filed: Nov. 3, 2005

(65) Prior Publication Data

US 2006/0148572 A1    Jul. 6, 2006

(30) Foreign Application Priority Data

Dec. 17, 2004    (KR) ...................... 10-2004-0108154

(51) Int. Cl.
G06F 12/00    (2006.01)
G06F 17/30    (2006.01)

(52) U.S. Cl. ...................................... 707/201; 707/203
(58) Field of Classification Search .................. 707/206
See application file for complete search history.

(56) References Cited

U.S. PATENT DOCUMENTS

| | | | |
|---|---|---|---|
| 4,687,660 A | 8/1987 | Baker et al. | 424/465 |
| 4,769,027 A | 9/1988 | Baker et al. | 424/493 |
| 5,358,970 A | 10/1994 | Ruff et al. | 514/649 |
| 5,427,798 A | 6/1995 | Ludwig et al. | 424/464 |
| 5,541,231 A | 7/1996 | Ruff et al. | 514/649 |
| 5,681,584 A | 10/1997 | Savastano et al. | 424/473 |

(Continued)

FOREIGN PATENT DOCUMENTS

EP    0171457 B1    3/1992 ...................... 9/24

(Continued)

OTHER PUBLICATIONS

Sladjan Bogojevic et al. "The Architecture of Massive Multiplayer Online Games" [online], Sep. 8, 2003, Department of Computer Science, Lund Institute of Technology, Sweden < URL: http://graphics.cs.lth.se/theses/projects/mmogarch/ >, pp. 9-60.*

(Continued)

*Primary Examiner*—Mohammad Ali
*Assistant Examiner*—Angelica Ruiz
(74) *Attorney, Agent, or Firm*—Ladas & Parry LLP

(57) ABSTRACT

A database query system is provided. The database cache system includes: a network library which processes an access request issued by the online game server by using an input output completion port (IOCP); at least one database connection module which provides a connector for reading data from the database or recording data to the database; a database cache which stores data read from the database by the database connection module; and at least one cache buffer which is allotted to an IOCP worker thread corresponding to a database query request issued by the online game server and stores data read from the database, which is to be transmitted to the online game server.

4 Claims, 6 Drawing Sheets

U.S. PATENT DOCUMENTS

| | | | |
|---|---|---|---|
| 5,727,203 A | 3/1998 | Hapner et al. | 707/103 |
| 5,731,000 A | 3/1998 | Ruff et al. | 424/451 |
| 5,763,493 A | 6/1998 | Ruff et al. | 514/617 |
| 5,765,159 A * | 6/1998 | Srinivasan | 707/102 |
| 5,968,553 A | 10/1999 | Maitra et al. | 424/474 |
| 6,033,686 A | 3/2000 | Seth | 424/482 |
| 6,058,389 A * | 5/2000 | Chandra et al. | 707/1 |
| 6,083,532 A | 7/2000 | Zhang et al. | 424/468 |
| 6,096,341 A | 8/2000 | Seth | 424/482 |
| 6,117,453 A | 9/2000 | Seth | 424/486 |
| 6,120,803 A | 9/2000 | Wong et al. | 424/473 |
| 6,143,327 A | 11/2000 | Seth | 424/482 |
| 6,194,002 B1 | 2/2001 | Sherman | 424/464 |
| 6,210,716 B1 | 4/2001 | Chen et al. | 424/497 |
| 6,221,917 B1 | 4/2001 | Maitra et al. | 514/649 |
| 6,238,697 B1 | 5/2001 | Kumar et al. | 424/464 |
| 6,242,496 B1 | 6/2001 | Kulkami et al. | 514/649 |
| 6,251,430 B1 | 6/2001 | Zhang et al. | 424/468 |
| 6,306,436 B1 | 10/2001 | Chungi et al. | 424/464 |
| 6,333,332 B1 | 12/2001 | Han et al. | 514/276 |
| 6,346,268 B1 | 2/2002 | Zhang et al. | 424/468 |
| 6,350,471 B1 | 2/2002 | Seth | 424/480 |
| 6,368,628 B1 | 4/2002 | Seth | 424/480 |
| 6,462,237 B1 | 10/2002 | Gidwani et al. | 564/345 |
| 6,589,553 B2 | 7/2003 | Li et al. | 424/461 |
| 6,598,119 B2 | 7/2003 | Becker et al. | 711/119 |
| 6,652,882 B1 | 11/2003 | Odidi et al. | 424/486 |
| 6,665,704 B1 | 12/2003 | Singh | 719/330 |
| 7,051,330 B1 * | 5/2006 | Kaler et al. | 718/106 |
| 2002/0077177 A1 * | 6/2002 | Elliott | 463/40 |
| 2003/0220984 A1 * | 11/2003 | Jones et al. | 709/219 |
| 2005/0021751 A1 * | 1/2005 | Block et al. | 709/225 |

FOREIGN PATENT DOCUMENTS

| | | |
|---|---|---|
| KR | 19940017573 | 7/1994 |
| KR | 20010099350 | 11/2001 |
| KR | 20030008111 | 1/2003 |

OTHER PUBLICATIONS

'Design of Main-Memory Database Prototype System using Fuzzy Checkpoint Technique in Real-Time Environment' Park et al., The Transactions of the Korea Information Processing Society, 2000, vol. 7, No. 6, pp. 1753-1765.

'Relational Database Operations on Multi-processor with Program Controlled Cache Level Memory' Nakasumi et al., PDPTA '99 International Conference, pp. 1613-1619.

'Regular Interval Fuzzy Checkpointing Technique for Main Memory Databases' Kim et al., The Korea Information Science Society, Publication of Research Papers, Fall of 1999, vol. 26, No. 2, pp. 255-257.

'Performance Analysis on Main Memory Database System Architectures' You et al., The Korea Information Science Society, Publication of Research Papers, Spring of 1999, vol. 26, No. 1, pp. 192-193.

* cited by examiner

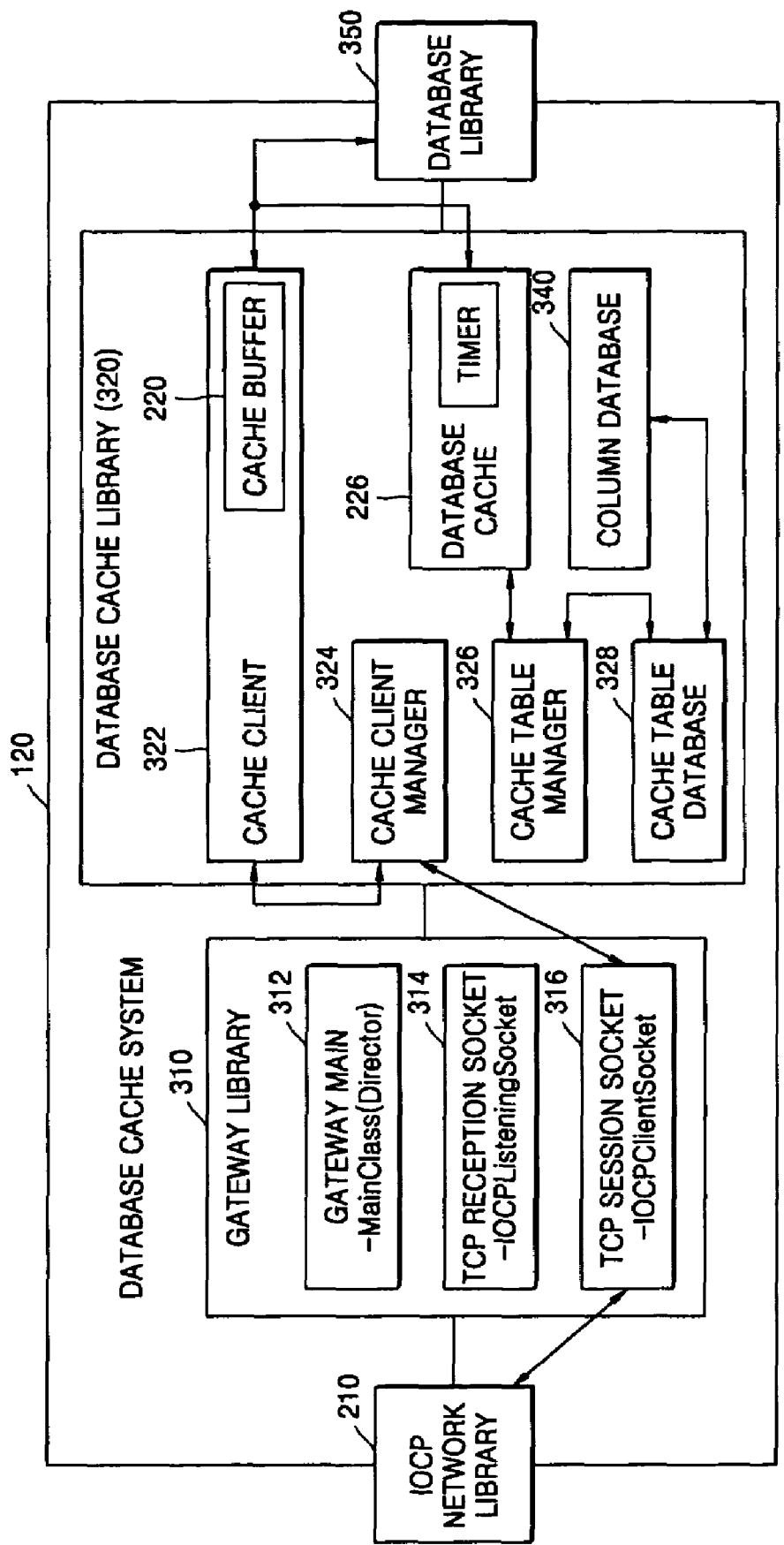

FIG. 4A

❏ SELECT

| Type | Command | | TableName | | Search |
|---|---|---|---|---|---|
| SELECT | * | FROM | tblCharacter | WHERE | GameID='123' |
| SELECT | GameID, LoginID | FROM | tblCharacter | WHERE | Pos_X < 1 AND Pos_Y >=10 |

FIG. 4B

❏ UPDATE

| Type | TableName | | Command | | Search |
|---|---|---|---|---|---|
| UPDATE | tblCharacter | SET | Pos_X=10.5, Item='1:45-5' | WHERE | GameID='123' |
| UPDATE | tblCharacter | SET | LoginID ='55' | WHERE | GameID like '12' |

FIG. 4C

❏ DELETE

| Type | TableName | Search |
|---|---|---|
| DELETE | tblCharacter | WHERE GameID='123' |
| DELETE | tblCharacter | WHERE CreateTime < '2003-5-1' |

FIG. 4D

❏ INSERT

| Type | TableName | | Command |
|---|---|---|---|
| INSERT | tblCharacter | VALUES | ('123', '45', 1, 5, 1.155, 2.166, 10000000 ,'3:21-500', '2004-1-1 16:00:00') |

FIG. 6

□ RANDOM QUERY GENERATION RATES : SELECT(32) : UPDATE(16) : INSERT(2) : DELETE(1)]
* UM 0 : WHEN NOT USING UPDATE BATCH PROCESS
* UM 10 : WHEN USING UPDATE BATCH PROCESS EVERY 10 SECONDS
* UM 20 : WHEN USING UPDATE BATCH PROCESS EVERY 20 SECONDS

|  |  | DATABASE CACHE SYSTEM | | | | MSSQL |
|---|---|---|---|---|---|---|
|  |  | DYNAMIC LOADING | OVERALL DATA LOAD | | | |
|  |  | UM0 | UM0 | UM10 | UM20 | |
| 1 MIN | QUERY (DELAY) | 8554 (69ms) | 17634 (33ms) | 17450 (33ms) | 17605 (33ms) | 6240 (64ms) |
|  | DCS/MSSQL | 1.37 | 1.37 | 1.37 | 1.37 | 1.37 |
| 2 MIN | QUERY (DELAY) | 17556 (68ms) | 35648 (32ms) | 37186 (31ms) | 37266 (31ms) | 12863 (92ms) |
|  | DCS/MSSQL | 1.36 | 2.77 | 2.89 | 2.89 | 1.00 |
| 3 MIN | QUERY (DELAY) | 25837 (69ms) | 54173 (32ms) | 55996 (31ms) | 56385 (31ms) | 19134 (93ms) |
|  | DCS/MSSQL | 1.35 | 2.83 | 2.92 | 2.94 | 1.00 |
| 4 MIN | QUERY (DELAY) | 34856 (68ms) | 72705 (32ms) | 74693 (31ms) | 75119 (31ms) | 25540 (93ms) |
|  | DCS/MSSQL | 1.36 | 2.84 | 2.92 | 2.94 | 1.00 |
| 5 MIN | QUERY (DELAY) | 43690 (68ms) | 91068 (32ms) | 94112 (31ms) | 94426 (31ms) | 31485 (94ms) |
|  | DCS/MSSQL | 1.38 | 2.89 | 2.98 | 2.99 | 1.00 |

FIG. 7

- SAME TEST TABLE IS SET FOR DBCache_Test & SQL_Test Database
- DETERMINE WHETHER RESULTS OBTAINED BY PROCESSING QUERY REQUEST TO DBCache_Test DATABASE ARE IDENTICAL TO RESULTS OBTAINED BY PROCESSING QUERY
- DETERMINE WHETHER RESULTS OBTAINED BY PROCESSING QUERIES 'SELECT', 'INSERT', 'UPDATE', AND 'DELETE' USING DBCache_Test DATABASE ARE IDENTICAL TO RESULTS OBTAINED BY PROCESSING QUERIES 'SELECT', 'INSERT', 'UPDATE', AND 'DELETE' USING SQL_Test DATABASE

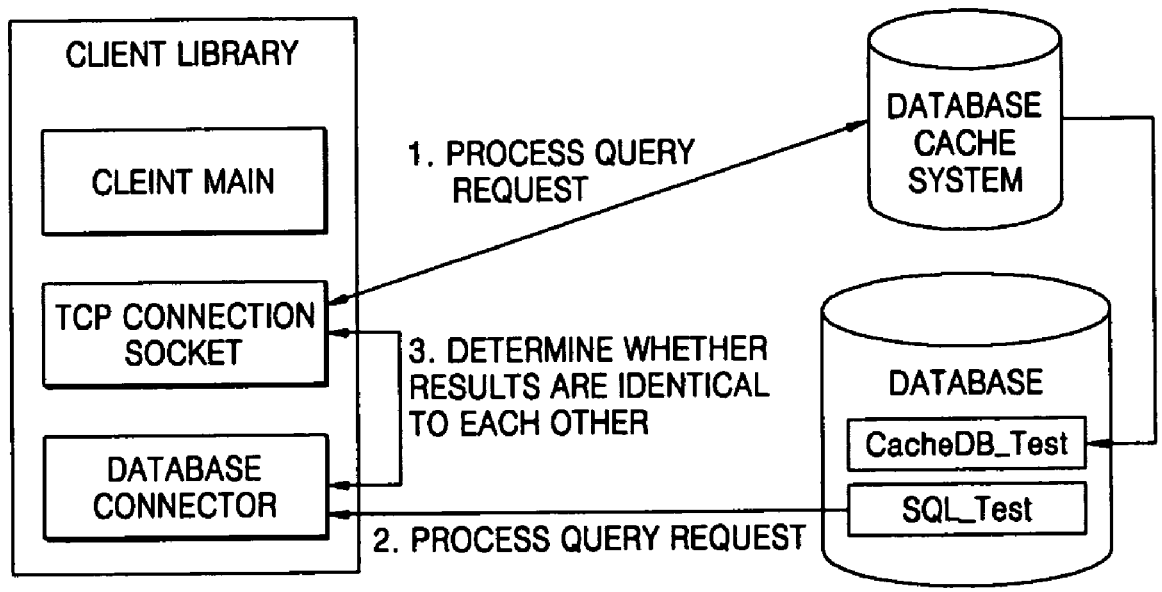

DATABASE CACHE SYSTEM

CROSS-REFERENCE TO RELATED PATENT APPLICATION

This application claims the benefit of Korean Patent Application No. 10-2004-0108154, filed on Dec. 17, 2004, in the Korean Intellectual Property Office, the disclosure of which is incorporated herein in its entirety by reference.

BACKGROUND OF THE INVENTION

1. Field of the Invention

The present invention relates to a database cache system, and more particularly, to a database cache system that helps an online game server to access a database.

2. Description of the Related Art

In the case of an online game in which several thousands or tens of thousands of users can participate at the same time, the two most important factors that determine the cost effectiveness and the quality of services of an online game server are how effectively the online game server can operate and the lag of responses to users' queries. Dozens or several hundreds of queries are generally made every second by users regarding how they will play an online game and what are the rules of the online game. However, databases are generally not capable of keeping up with such a breakneck speed of generating queries. Therefore, once databases lag behind in dealing with queries made by users, they also lag behind in timely responding to the queries, a phenomenon which is called query lag. The query lag, which may considerably deteriorates the quality of services, can be reduced to some extent by separating a database from an online game server, in which case, however, additional service expenses are undesirably incurred.

SUMMARY OF THE INVENTION

The present invention provides a database cache system that guarantees a high efficiency and a high reliability of a database for online games by maximizing a server's efficiency of using the database.

According to an aspect of the present invention, there is provided a database cache system which is located between an online game server and a database, supports a non-blocking query processing approach, and minimizes query compilations, transaction processing, and physical disc accesses. The database cache system includes: a network library which processes an access request issued by the online game server by using an input output completion port (IOCP); at least one database connection module which provides a connector for reading data from the database or recording data to the database; a database cache which stores data read from the database by the database connection module; and at least one cache buffer which is allotted to an IOCP worker thread corresponding to a database query request issued by the online game server and stores data read from the database, which is to be transmitted to the online game server.

Accordingly, it is possible to reduce database development costs and guarantee an efficient use of databases. In addition, it is possible to improve the quality of online games by reducing online game service expenses and minimizing query lag. Moreover, it is possible to guarantee high productivity in terms of the development and management of databases.

BRIEF DESCRIPTION OF THE DRAWINGS

The above and other features and advantages of the present invention will become more apparent by describing in detail exemplary embodiments thereof with reference to the attached drawings in which:

FIG. 3 is a detailed block diagram of the database cache system of FIG. 2;

FIGS. 4A through 4D are diagrams illustrating the standardization of queries SELECT, UPDATE, INSERT, and DELETE for minimizing query compilations;

FIG. 6 is a diagram illustrating simulation results indicating the performance of a database cache system according to an exemplary embodiment of the present invention; and FIG. 7 is a diagram illustrating a simulation environment for determining the performance of the database cache system according to an exemplary embodiment of the present invention.

DETAILED DESCRIPTION OF THE INVENTION

The present invention will now be described more fully with reference to the accompanying drawings in which exemplary embodiments of the invention are shown.

Database middleware, i.e., a database interface between a database and a user, has been used in various fields for communication, Internet service, and financial applications. Accordingly, much research has been conducted on optimizing database modules for specific services or modules for general services. One of the major purposes of developing database middleware is to respond to users' queries as quickly as possible, since a system comprised of a database, a user access module, and database middleware has a potential for overcoming the limits of a conventional information system.

Figure 1:
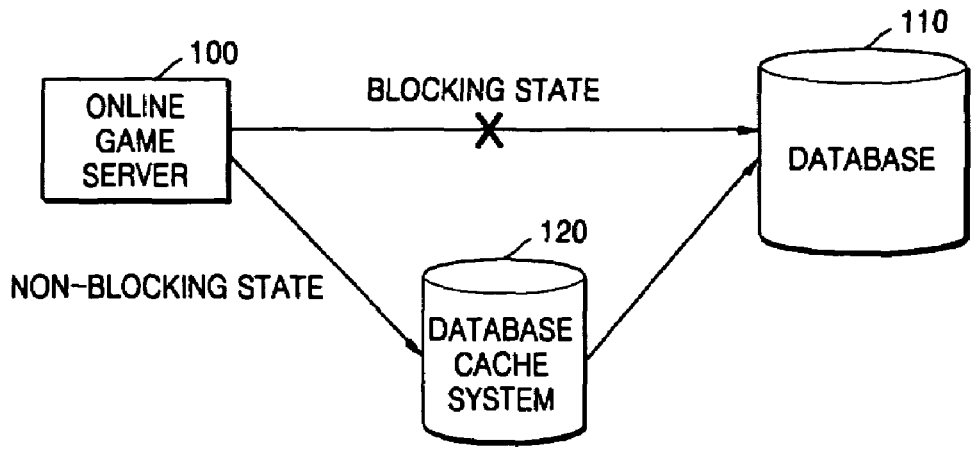
FIG. 1 is a diagram illustrating a basic concept of a database cache system for an online game.

FIG. 1 is a diagram illustrating a basic concept of a database cache system for an online game. Referring to FIG. 1, game service expenses and the quality of game services are dependent on the performance of an online game server 100. Users may make dozens or several hundreds of queries every second to a database 110 while playing an online game. The response speed of the database 110 considerably affects the performance of the online game server 100. Since the database 110 deals with the queries in a blocking state, threads of the online game server 100 have no option but to be in standby until the online game server 100 respond to the queries, which is highly inefficient. In addition, query compilations, transaction processes, and physical disc accesses may increase the inefficiency of an entire query processing operation by increasing the amount of time required by the database 110 to respond to the queries.

Referring to FIG. 1, a database cache system 120, which is located between the online game server 100 and the database 110, helps the database 110 to deal with the queries made thereto in a non-blocking state and minimizes the numbers of query compilations, transaction processes, and physical disc accesses. Thus, the inefficiency of the entire query processing operation decreases, and the performance of the online game server 100 considerably improves.

Figure 2:
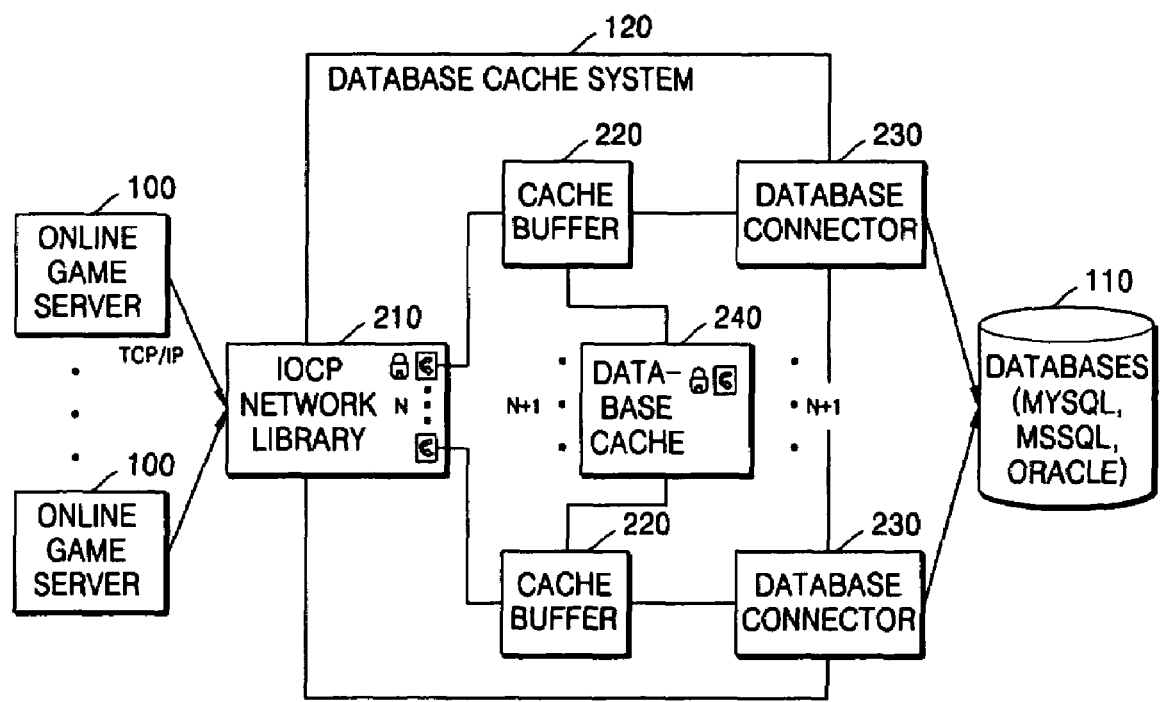
FIG. 2 is a block diagram of a database cache system according to an exemplary embodiment of the present invention.

FIG. 2 is a block diagram of a database cache system 120 according to an exemplary embodiment of the present invention. Referring to FIG. 2, the database cache system 120 is located between a plurality of online game servers 100 and a plurality of databases 110 (MYSQL, MSSQL, and Oracle). When each of the online game servers 100 issues an access request to the database cache system 120 using Transmission Control Protocol/Internet Protocol (TCP/IP), the database cache system 120 processes the access request issued by each of the online game servers 100 using input output completion port (IOCP) technology. In addition, the database cache system 120 includes a connection module for connecting the database cache system 120 to all of the databases 110 (MYSQL, MSSQL, and Oracle) and thus can maintain its connection to the databases 110 (MYSQL, MSSQL, and Oracle). In other words, the online game servers 100 can easily use the databases 110 (MYSQL, MSSQL, and Oracle) via the database cache system 120 and can improve the speed of responding to a user by minimizing the number of times it needs to access the databases 110 (MYSQL, MSSQL, and Oracle) while processing the user's queries.

Referring to FIG. 2, the database cache system 120 includes an IOCP network library 210, a plurality of cache buffers 220, a plurality of database connectors 230, and a database cache 240.

The IOCP network library 210 is a module for handling queries made by the online game server 100 connected to the database cache system 200. Therefore, the stability and efficiency of the IOCP network library 210 are emphasized.

The cache buffers 220 are modules for helping database query requests issued by the online game servers 100 to be quickly processed. The cache buffers 220 can minimize the allocation, removal, and use of memories. The database query requests issued by the online game servers 100 are processed by using the cache buffers 220 allotted to the respective IOCP worker threads. The cache buffers 220 are recyclable and thus can minimize the inefficiency of allotting a memory to the online game servers 100 or removing the allotted memory whenever the online game servers 100 issue database query requests.

The database connectors 230 are modules for connecting the database cache system 120 to the databases 110 (MYSQL, MSSQL, and Oracle) and include a number of ports corresponding to the number of databases 110. The online game servers 100 can use any of the databases 110 (MYSQL, MMSQL, and Oracle) simply by accessing the database cache system 120, regardless of the types of the databases 110 (MYSQL, MMSQL, and Oracle). Since the database connectors 230 enable the online game servers 100 to use different types of databases, the applicability and expendability of the database cache system 120 can be enhanced.

The database cache 240 is a module for managing data and is an essential part of the database cache system 120. The database cache system 120 may fetch as much information as possible from the database cache 240 via the cache buffers 220 and may additionally read data from the databases 110 (MYSQL, MMSQL, and Oracle) only when the information fetched from the database cache 240 is insufficient to process a user's query. Alternatively, the cache database system 120 may fetch all information necessary to process a user's query from the databases 110 (MYSQL, MMSQL, and Oracle) and then may not access the databases 110 (MYSQL, MMSQL, and Oracle) afterwards for the purpose of referencing data stored in the databases 110 (MYSQL, MMSQL, and Oracle).

FIG. 3 is a block diagram of a database cache system 120 according to an exemplary embodiment of the present invention. In FIGS. 2 and 3, like reference numerals represent like elements, and thus their detailed descriptions will be skipped.

Referring to FIG. 3, the database cache system 120 includes an IOCP network library 210, a gateway library 310, a database cache library 320, and a database library 350.

The gateway library 310 receives a database query request issued by each of the online game servers 100 and transmits the received request to the database cache library 320. The gateway library 310 includes a gateway main 312, a TCP reception socket 314, and a TCP session socket 316. A developer of the gate library 310 may develop additional modules for the functional expansion of the gateway library 310.

The database cache library 320 is an essential part of the database cache system 120. The database cache library 320 includes a cache client 322 with a cache buffer 220 installed therein, a cache client manager 324, a cache table manager 326, a cache table database 328, a cache column database 340, and a database cache 226. The cache table manager 326, the cache table database 328, and the cache column database 340 are modules for managing data under the control of the database cache 226. The cache client 322 includes the cache buffer 220 for quickly processing a query request and determines whether a response to the query request is to be transmitted to the databases 110 or to the database cache 226. The cache client manager 324 manages the cache client 322. The cache table manager 326 manages the cache table database 328. The cache table database 328 includes data recorded in a variety of tables related to running online games, authenticating online game users, and imposing online game fees, such as a login table, a fee imposition table, a game character table, a game item table, a search table, and a game guild table.

FIGS. 4A through 4D are diagrams illustrating the standardization of queries 'SELECT', 'UPDATE', 'INSERT', and 'DELETE' for minimizing query compilations. The queries 'SELECT', 'UPDATE', 'INSERT', and 'DELETE' may each contain some of the following pieces of query information: query type information Type; query table information TableName; query command information Command; and query search information Search. The queries 'SELECT' and 'UPDATE' include all of the query type information Type, the query table information TableName, the query command information Command, and the query search information Search. The query 'INSERT' includes the query type information Type, the query table information TableName, and the query command information Command. The query 'DELETE' includes the query type information Type, the query table information TableName, and the query search information Search. The online game servers 100 divide the queries 'SELECT', 'UPDATE', 'INSERT', and 'DELETE' in advance into their respective sets of query information and issue data query requests to the database cache system 120 with reference to the query information constituting each of the queries 'SELECT', 'UPDATE', 'INSERT', and 'DELETE', thereby minimizing the query compilation costs. In addition, it is possible to easily generate an SQL query that can be executed in the databases 110 by referencing the query information constituting each of the queries 'SELECT', 'UPDATE', 'INSERT', and 'DELETE'.

Figure 5:
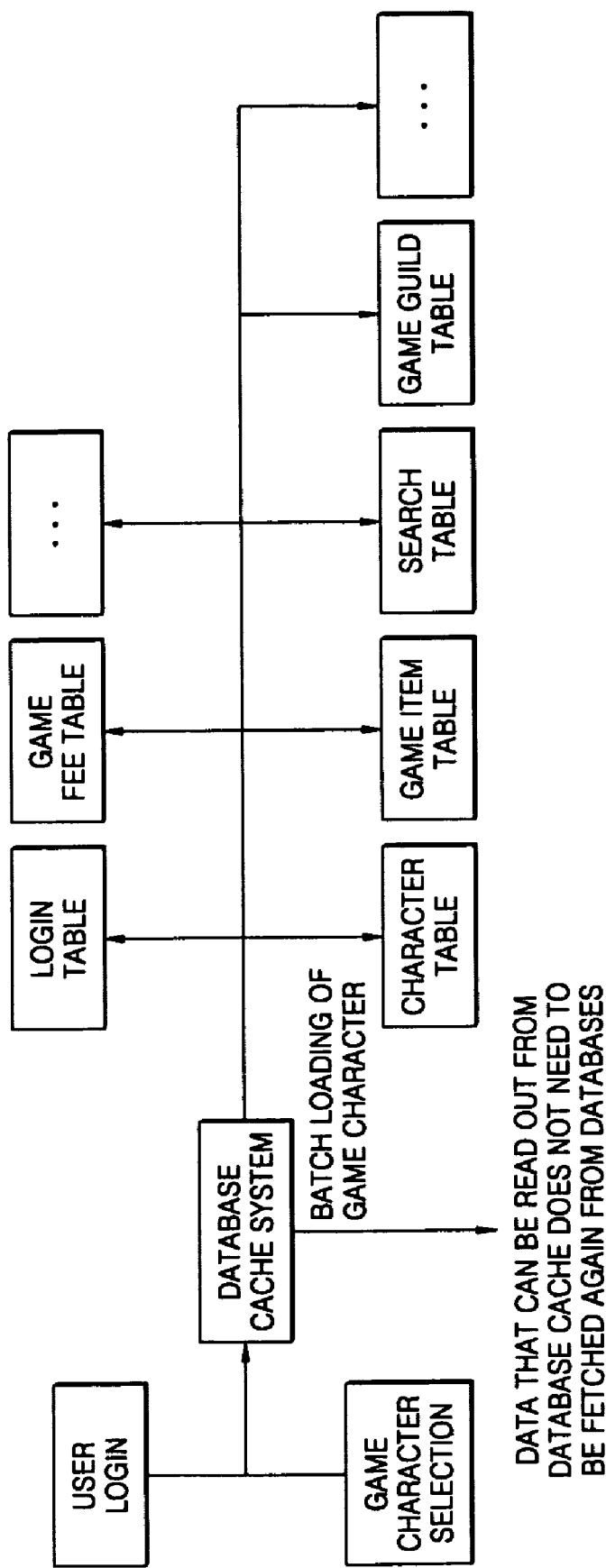
FIG. 5 is a diagram illustrating a method of loading data in advance for determining the data loading characteristics of an online game server.

FIG. 5 is a diagram illustrating a method of loading data in advance necessary to determine the data loading characteristics of an online game server 100. Referring to FIG. 5, an intellectual method in which, when a user logs on to the online game server 100, fee information and login information are read to prepare for a request issued by the user. Information needed by the online server 100 after the user selects a game character, such as game character information, game item information, game quest information, and game guild information, is also read in advance so that requests issued by the user after selecting the game character can be efficiently handled. This type of data loading method is exemplary, and thus, it is possible to develop an appropriate data loading method for an online game using the database cache system 120. Therefore, the database cache system 120 can provide an efficient and general way of enhancing the speed of responding to the user.

FIG. 6 is a diagram illustrating simulation results for the analysis of the performance of a database cache system according to an exemplary embodiment of the present invention. Referring to FIG. 6, test results obtained when loading all data using a database MSSQL with the aid of the database cache system 120 were compared with test results obtained when loading all data using a database MSSQL without the aid of the database cache system 120. The efficiency of processing a query request is third times higher when using the database cache system 120 than when not using the database cache system 120, and the amount of time required to process a query request when using the database cache system 120 is about one third of the amount of time required to process a query request when not using the database cache system 120. In addition, a method of loading data whenever it is necessary was adopted, in which case, the efficiency of processing a query request increased by about 38%. It is expected to further improve the efficiency of processing a query request by using the data loading method as illustrated in FIG. 5. A module for generating a random query request, which is included in a library of the database cache system 120, was used for testing the database cache system 120.

FIG. 7 is a diagram illustrating a simulation environment in which the performance of a database cache system 120 according to an exemplary embodiment of the present invention is tested. Referring to FIG. 7, assuming that a database 110 operates properly, it is determined whether results obtained when accessing with the aid of the database cache system 120 are identical to results obtained when accessing the database 110 without the aid of the database cache system 120. If the results obtained when accessing the database 110 with the aid of the database cache system 120 are identical to the results obtained when accessing the database 110 without the aid of the database cache system 120, the database cache system 120 operates properly.

The database cache system 120 can ensure the integrity of database by accessing existing databases from time to time and has already been proved to be stable through various stability tests. The database cache system 120 processes most of a plurality of query requests that it receives on a physical memory level, thus removing unnecessary accesses to a physical disc. In addition, the database cache system 120 can ensure a high efficiency by minimizing memory allocations or removals.

Moreover, the database cache system 120 can reuse data fetched from databases. In the case of an online game, data cannot be reused and thus needs to be fetched from the databases whenever a user issues a query request or a user's game character takes some action, which is inefficient. However, the database cache system 120 can prevent data from being repeatedly fetched from the databases by reusing data fetched from the databases with the aid of the database cache 240 installed therein.

Furthermore, the database cache system 120 determines how an online game server loads data and thus reads data necessary to handle a query request issued to the online server in advance in the database cache 240. For example, the database cache system 120 fetches all information necessary to authenticate a user, such as login information and fee information, from the databases to the database cache 240 when the user logs on thereto and thus can quickly process subsequent operations. In addition, when the user selects a predetermined game character, the database cache system 120 can fetch information regarding the game character selected by the user from the databases and thus can enable an online game to be run without the need to further reference the databases.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, code, and code segments needed for realizing the present invention can be easily deduced by one of ordinary skill in the art.

As described above, it is possible to reduce database development costs and efficiently use databases by applying the database cache system according to the present invention to the development of a large-scale online game. Therefore, it is possible to improve the quality of an online game by reducing game service charges and response delays. In addition, since the database cache system according to the present invention allows an online game server to access any type of database, it is possible to further reduce database development and management costs and shorten the period of time taken to develop databases.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A database cache system which is located between at least one online game server and at least one database, supports a non-blocking query processing approach, and minimizes query compilations, transaction processing and physical disc accesses, the database cache system comprising:

a network library which processes an access request issued by any of the at least one online game servers by using an input output completion port (IOCP);

a plurality of database connection modules each providing a connection to the at least one database for reading data from the at least one database or recording data to the at least one database, wherein the database connection modules allow the online game server to connect to any of the at least one database, regardless of the type of database;

a database cache which stores data read from the at least one database by the database connection module; and a plurality of cache buffers each corresponding to one of the database connection modules and each being allotted to an IOCP worker thread corresponding to a database query request issued by any one of the at least one online game server, wherein each of the cache buffers is used to process the query request issued by the at least one online game server, stores data read from the database to be transmitted to the at least one online game server, and obtains data from the database cache to be transmitted to the at least one online game server;

wherein the database cache stores the data read from the at least one database via any one of the cache buffers and each of the respective cache buffers used to process the query request obtains data from the database cache when the information of the database cache is sufficient for processing the query request and obtains data from the at least one database when the information is not sufficient, and wherein the database cache system fetches information from the at least one database via the cache buffer, and the information is fetched from the at least one database only when information fetched from the data base cache is insufficient, such that the database cache system processes most of the query requests on a physical memory level thereby removing unnecessary accesses to a physical disk and enhancing the speed of responding to a user wherein each database connection module of the plurality of database connection modules has a number of ports that is the same as the number of different types of databases, such that the database connection module can connect to any of the databases regardless of the type of database.

2. The database cache system of claim 1, wherein the database cache reads data from the at least one database before the data becomes necessary according to a set of data loading rules of the online game server and stores the read data.

3. The database cache system of claim 2, wherein different data loading rules are set for different online games provided by the online game server.

4. The database cache system of claim 1, wherein a query corresponding to the database query request comprises query type information, query table information, query command information and query search information and is received in such a manner that the query type information, the query table information, the query command information, and the query search information can be received separately from one another.

* * * * *